Patented Feb. 28, 1933

1,899,473

UNITED STATES PATENT OFFICE

LOUIS R. NICHOLS, OF WESTON, MASSACHUSETTS

HEAT INSULATING CEMENT

No Drawing.   Application filed March 21, 1931.   Serial No. 524,413.

This invention relates to heat insulating material, and pertains more particularly to insulating cement suitable for application as a coating or covering to the exterior surfaces of heating units, hot fluid conduits or containers, such as steam boilers, hot water heaters, steam or hot water pipes, hot water tanks, or the like.

The principal object of the invention is to provide an improved material or composition which is characterized by economy of production, ease of application, tenacity of adhesion to coated surfaces of varying slope and contour, hardness of surface after application, and especially its ability to reduce heat loss by conduction, convection or radiation through or from the applied coating. A further and more specific purpose is to utilize as an important ingredient of the composition a prevalent by-product of the combustion of coal, coke or similar fuel, to wit, soot which is ordinarily discarded as worthless waste material.

The soot which I employ in preparing my composition is deposited in the flues and smoke pipes of the common coal boiler, heater or furnace, and when removed from the heating unit, consists of finely divided, dust like particles of carbon and contains the general insulating properties of lamp black. Sometimes the soot, upon being removed from the heating unit is mixed with scale, ash, coal particles, silica or dirt. In such cases, I prefer to sift and screen the mixture through a filter not coarser than twenty mesh to the inch, before compounding it with other ingredients to produce my improved insulation.

Although the screened soot itself will, when moistened, adhere to a hard surface as a thin film (probably because of a phenomenon of molecular attraction), it is necessary to mix it with a cementitious binder or filler in order that a coating of the desired thickness will stick to the surface to be insulated; and I preferably use a binder which possesses fireproof and heat insulating as well as adhesive properties. The binder may accordingly comprise asbestos cement (a mixture of comminuted asbestos fibre and Portland cement in sufficient proportions to bind the same together upon wetting and allowing to set), or asbestos-magnesia cement (a similar cement containing finely divided magnesia), plus a small additional portion of Portland cement, if desired. The flue soot and the cement binder are thoroughly intermixed so that the soot particles are distributed throughout the resulting substantially homogeneous composition.

Cementitious materials of this type are commonly used for insulation purposes in the same manner as my composition is employed; the material is applied while moist or wet and allowed to dry in the form of an adhering coating, and its mode of application is consequently well understood. So far as I am aware, however, screened, flue soot has never been used as an essential ingredient of an insulating composition of this class, and I have discovered that a composition comprising a relatively large proportion of soot is not only considerably cheaper than the ordinary asbestos cement insulation, but also furnishes a more satisfactory coating and possesses relatively higher insulating value.

While the nature of the adhesive binder which is mixed with the soot, and the proportions of the respective ingredients may be varied within reasonable limits, as determined by experiment, for particular purposes, I have found that the following compositions are satisfactory: screened soot 70% by weight, asbestos cement 25%, and Portland cement 5%; soot 50%, asbestos cement 45%, Portland cement 5%; or soot 60%, asbestos cement, 37½%; Portland cement 2½%. In either of these formulæ commercial asbestos-magnesia cements may be substituted for the common asbestos cements in the same proportion. Although a composition containing 60% soot, 37½% asbestos-magnesia (85% magnesia), and 2½% Portland cement seemed most efficient with regard to heat insulating properties, I have found that a mixture comprising 60% soot and 40% asbestos-magnesia (50% magnesia) proved most satisfactory for general use, for it adhered to the coated surface better than the previous composition and exhibited approximately the same insulating capacity, hardness and other desirable properties as the other combinations contemplated by this invention. It will be understood that the percentages above named are approximate only, and that the relative proportions of the materials may vary to a reasonable extent without impairing the results.

When this material was applied as a coating approximately one inch thick, I found that the insulation adhered well and dried very hard without shrinking, cracking, or breaking away from the insulated surface upon drying; that its heat insulating characteristic was substantially higher than the usual asbestos, or asbestos-magnesia, cements; and that it was fireproof and resistant to moisture absorption. The extreme hardness of the coating renders the insulation more durable, as it is less likely to be torn, rubbed off, or otherwise damaged by external impacts; and also provides a substantially smooth exterior surface which may be painted if desired.

I attribute the success of my improved insulation to the following characteristics which are peculiar to the powdered soot constituting its major ingredient; its inherent nature as a mass of hard, finely divided carbon particles which when wet will closely adhere to a metal surface and to other ingredients of the composition and which when distributed through the coating provide air spaces which are relatively minute and hence tend to prevent internal circulation of heat; its low specific conductivity to heat (in the neighborhood of the insulation coefficient of lampblack; and its capacity to withstand high temperatures without burning, melting or cracking. Hence, any suitable cementitious binder which is adapted to be mixed with the soot and to cooperate therewith in evincing or promoting its inherent properties, may be employed in the composition; and it will be understood that the soot is thoroughly mixed or distributed through the binding material to provide a substantially homogeneous composition which hardens upon drying to permit a dense, compact and substantially impervious coating.

The insulating composition is prepared and applied in the ordinary manner by adding water until the material is of a pasty or plaster-like consistency, and then spreading the moistened material over the surface to be covered. Although the soot is less bulky than a similar weight of asbestos cement, it will be found that the spreading capacity of my composition compares favorably with that of plain asbestos-cement, and that it is not necessary to employ forms or stays for holding the wet coating in place (as in the case of asbestos-magnesia cement which does not stick readily and is difficult to apply).

As above stated, a composition having a major proportion of soot is not only a better insulating material than the present commercial products but also substantially less expensive, for this by-product of combustion has heretofore had no commercial value. Indeed, it is quite common for householders and industrial plants to expend considerable sums for heater-cleaning service, and this expense would also be reduced if a commercial outlet for the removed soot were available. Obviously such service establishments provide a ready and economical source of supply for the soot which may be incorporated in my composition.

In my previous experiments I have used soot from anthracite coal, bituminous coal and coke and have obtained substantially equal results from all three types of combustible carbon products; and it will be understood that my invention is not intended to be limited in respect to the source of the soot or to the particular materials herein described, except as the invention is defined in the following claims.

I claim:

1. A heat insulating composition capable of adhering to a metal surface while moist and of hardening thereon after drying, and consisting of a substantially homogeneous mixture of flue soot and a heat resistant, hydraulic cement.

2. A heat insulating composition capable of adhering to a metal surface while moist and of hardening thereon after drying, and consisting of a substantially homogeneous mixture of flue soot and an asbestos cement.

3. A heat insulating composition capable of adhering to a metal surface while moist and of hardening thereon after drying, and consisting of a substantially homogeneous mixture of at least fifty per cent., finely divided flue soot, and less than fifty per cent. asbestos-magnesia cement.

4. A heat insulating composition capable of adhering to a metal surface while moist and of hardening thereon after drying, and consisting of a substantially homogeneous mixture of screened flue soot and a heat resistant, hydraulic cement, the soot comprising finely divided particles capable of passing through a screen of twenty mesh to the inch and constituting more than fifty per cent. of the composition.

Signed by me at Boston, Massachusetts, this 19th day of March, 1931.

LOUIS R. NICHOLS.